(12) United States Patent
Datari

(10) Patent No.: US 6,418,169 B1
(45) Date of Patent: Jul. 9, 2002

(54) SYSTEM FOR PRIORITIZING BI-DIRECTIONAL BROADCAST DATA

(75) Inventor: Srinivasa Rao Datari, Indianapolis, IN (US)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/129,968

(22) Filed: Aug. 6, 1998

(30) Foreign Application Priority Data

Oct. 16, 1997 (GB) .............................................. 9721947

(51) Int. Cl.⁷ ................................................ H04B 1/66
(52) U.S. Cl. ...................... 375/240.28; 725/95; 725/131
(58) Field of Search .................. 348/423.1; 375/240.28; 725/95, 131

(56) References Cited

U.S. PATENT DOCUMENTS

| | | | |
|---|---|---|---|
| 4,953,157 A | 8/1990 | Franklin et al. ............. | 370/230 |
| 5,140,417 A | 8/1992 | Tanaka et al. .......... | 375/240.01 |
| 5,506,844 A | 4/1996 | Rao ........................... | 370/468 |
| 5,541,919 A | 7/1996 | Yong et al. .................. | 370/416 |
| 5,623,490 A | 4/1997 | Richter et al. .............. | 370/263 |
| 5,671,225 A * | 9/1997 | Hooper et al. ................ | 725/95 |

FOREIGN PATENT DOCUMENTS

| | | | |
|---|---|---|---|
| EP | 762 704 | 3/1997 | ........... H04L/29/06 |
| FR | 2724516 | 3/1996 | ............ H04N/7/52 |
| WO | 96/24223 | 8/1996 | |
| WO | WO97/28499 | 8/1997 | ............. G06F/9/00 |

OTHER PUBLICATIONS

Forschung & Entwicklung, Verknupfung von TV mit Internet, May, 1996 pp. 70–71, Germany (Translation attached).

* cited by examiner

Primary Examiner—Howard Britton
(74) Attorney, Agent, or Firm—Joseph S. Tripoli; Ronald H. Kurdyla; Joel M. Fogelson

(57) ABSTRACT

A video decoder system processes packetized data including header information, payload information and attributes associated with the content of the payload information. The decoder system identifies and compares the attributes of the received packetized data with attributes in a predetermined hierarchical priority profile for associating individual attributes with a desired data output priority. The priority profile may be provided by a remote service provider, or be entered locally by a user or be a default pre-set profile. The received packetized data is collated and output based on the attribute comparison and in accordance with the desired output priority.

19 Claims, 7 Drawing Sheets

| BROADCAST & DATA CHANNEL | |
|---|---|
| CHANNEL BANDWIDTH | 6 MHz |
| MODULATION FORMAT | 64/256 QAM |
| SYMBOL RATE | 5.057MS/sec, 5.361MS/sec |
| RAW TRANSPORT RATE | 30.34Mbps (64QAM)<br>422.88Mbps (256QAM) |
| FEC | CONCATENATED REED-SOLOMON WITH VARIABLE DEPTH CONVOLUTIONAL INTERLEAVER |
| EFFECTIVE DATA RATE | 27.01 Mbps (64 QAM)<br>38.15 Mbps (256 QAM) |

FIG. 2

| RETURN CHANNEL | |
|---|---|
| CHANNEL BANDWIDTH | 0.2, 0.4, 0.8, 1.6, 3.2 MHz |
| MODULATION FORMAT | QPSK/16 QAM |
| SYMBOL RATE | 0.16, 0.32, 0.64, 1.28, 2.56 MS/S |
| RAW TRANSPORT RATE | 0.16 - 10.24 MB/s |
| FEC | SELECTABLE, E.G. REED SOLOMON, OR NONE |
| EFFECTIVE DATA RATE | 0.1 - 10.24 MB/s |

FIG. 3

| DOWNSTREAM CHANNEL TRAFFIC TYPE | AVERAGE RATE |
|---|---|
| CONDITIONAL ACCESS FOR ANALOG SERVICES | 20 Kbps |
| ENTITLEMENT MANAGEMENT MESSAGES (EMMS) | 50 Kbps |
| BROADCAST DATA | 20 Kbps |
| NETWORK MANAGEMENT | 20 Kbps |
| MPEG OVERHEAD | 800 Kbps |
| MCNS SIGNALING | 5.2 Mbps |
| APPLICATION DOWNLOAD | 10 Kbps PER ACTIVE SUBSCRIBER |
| EXTERNAL DEVICE DATA SERVICES | 200 Kbps PER ACTIVE SUBSCRIBER |
| VBR DOWNLOAD | 10 Kbps PER ACTIVE SUBSCRIBER |
| EPG DATA | UP TO 300 Kbps |
| EFFECTIVE BANDWIDTH AVAILABLE | 21 Mbps (APPROX.) |

FIG. 4

| UPSTREAM CHANNEL TRAFFIC TYPE | AVERAGE RATE |
|---|---|
| NETWORK MANAGEMENT | 20 Kbps |
| EXTERNAL DEVICE DATA SERVICES | 20 Kbps PER ACTIVE SUBSCRIBER |
| MCNS SIGNING | 500 Kbps |
| EFFECTIVE BANDWIDTH AVAILABLE | 4.6 Mbps (APPROX.) |

FIG. 5

| INTERFACE # | PHYSICAL FORMAT | DESCRIPTION |
|---|---|---|
| 1 | CABLE MODEM TERMINATION SYSTEM-NETWORK SIDE INTERFACE AND CABLE MODEM TERMINATION SYSTEM SECURITY MANAGEMENT INTERFACE<br><br>FOR EXAMPLE, SONET ATM OVER OC-3, FAST ETHERNET OR ANOTHER INTERFACE | THIS IP BASED PHYSICAL INTERFACE SERVES SEVERAL LOGICAL FUNCTIONS:<br><br>• ACCESS TO THE SECURITY AND ACCESS CONTROLLER SERVER. CABLE MODEM TERMINATION SYSTEM SECURITY MANAGEMENT INTERFACE. THIS COMMUNICATION LINK IS IMPLEMENTED USING A SECURE NETWORK ACCESS PROTOCOL SUCH AS REMOTE AUTHENTICATION DIAL-IN-USER SERVICE (RADIUS). THE SECURITY SERVER IS IMPLEMENTED ON AN OPEN COMPUTING PLATFORM, AND CAN RESIDE IN THE CENTRAL HEAD END AS A PART OF A PROXY SERVER CLUSTER.<br>• DATA TRAFFIC. THIS INCLUDES ALL SERVICES PROVIDED OVER IP (DATA, VIDEO-ASSOCIATED DATA, INTERACTIVE PROGRAM GUIDES, AND OTHERS) TO THE STU AS A PART OF THE INTERACTIVE CHANNEL.<br>• RETURN TRAFFIC GENERATED BY THE STU. |
| 2 | SAME AS 1 ABOVE, PROVIDED BY A LOCAL ATM SWITCH IN CASE MULTIPLE DEVICE ACCESS TO WAN AT THE LOCAL HUB IS DESIRED. | AS ABOVE |
| 3 | THE REVERSE DATA CHANNEL IS QPSK OR 16-QAM MODULATED OVER AN ELECTRICAL LINK. | 2-10 Mbps RETURN DATA RATE DEPENDING ON THE CHARACTERISTICS OF THE CABLE SYSTEM AND THE MODULATION TECHNIQUE. |
| 4 | THE FORWARD DATA CHANNEL IS 64-QAM-MODULATED OR 256 QAM MODULATED OVER AN ELECTRICAL LINK. | 27 Mbps FORWARD DATA RATE FOR 64-QAM MODULATED SYSTEM. |
| 5 | CABLE MODEM TERMINATION SYSTEM UPSTREAM RF SIDE INTERFACE (QPSK/16 QAM MODULATED). | MCNS VARIABLE LENGTH DATA PACKET FORMAT. |
| 6 | CABLE MODEM TERMINATION SYSTEM DOWNSTREAM RF SIDE INTERFACE (QAM MODULATED). | IP OVER MPEG DATA PACKET FORMAT. CONVERSION FROM IP OVER ATM INCOMING INTO THE CABLE ROUTER IS PERFORMED AUTOMATICALLY BY THE DEVICE. |
| 7 | RF FREQUENCY COMBINER (54-750MHz) OVER AN ELECTRICAL LINK. | |
| 8 | RF FREQUENCY SPLITTER (5-42MHz) OVER AN ELECTRICAL LINK. | |
| 9 | AM-MODULATED OVER OPTICAL FIBER (OPTICAL LINK). | ELECTRICAL TO OPTICAL AND OPTICAL TO ELECTRICAL CONVERSION AT THE HUB IS PERFORMED BY THE TRANSMITTER AND RECEIVER RESPECTIVELY. |
| 10 | DIGITAL SET-TOP UNIT INTERFACE OVER THE COAXIAL CABLE FROM THE NODE 107. | OPTICAL TO ELECTRICAL CONVERSION IS PERFORMED AT THE NODE 107. |

FIG. 9

SYSTEM FOR PRIORITIZING BI-DIRECTIONAL BROADCAST DATA

FIELD OF THE INVENTION

This invention concerns prioritizing bi-directional communication data in a broadcast system.

BACKGROUND OF THE INVENTION

Home entertainment set-top box systems which combine Personal Computer and television functions (PC/TV functions) are increasingly becoming generic, User interactive, multiple source and multiple destination communication devices. Such systems are required to communicate in different data formats between multiple locations for a variety of applications in response to User requests. For example, a set-top box system may receive data from satellite or terrestrial sources comprising High Definition Television (HDTV) broadcasts, Multi-point Microwave Distribution System (MMDS) broadcasts and Digital Video Broadcasts (DVB). A set-top box system may also receive and transmit data via telephone (e.g. the Internet) and coaxial lines (e.g. cable TV) and from both remote and local sources such as Digital Video Disk (DVD), CDROM, VHS and Digital VHS (DVHS™) type players, PCs, and many other types of sources.

It is desirable for a set-top box system to be able to support bi-directional communication and in-home control functions and to be able to access and decode information from multiple broadcast sources. It is also desirable for a set-top box system to be able to seamlessly combine the decoded information for presentation to a User. There are a number of problems in achieving such a system. Specifically, problems arise in efficiently acquiring information of different data formats from different sources and prioritizing the processing of the information. These problems are addressed by a system according to the present invention.

SUMMARY OF THE INVENTION

A video decoder system processes packetized data including header information, payload information and attributes associated with the content of the payload information. The decoder system advantageously identifies and compares the attributes of the received packetized data with attributes in a predetermined hierarchical priority profile for associating individual attributes with a desired data output priority. The priority profile may be provided by a remote service provider, entered locally by a user or be a default pre-set profile. The received packetized data is collated and output based on the attribute comparison and in accordance with the desired output priority. The system thereby enables a user or service provider to adaptively prioritize services in a decoder for customization or structured billing purposes, for example.

BRIEF DESCRIPTION OF THE DRAWINGS

In the drawing:

FIGS. 2 and 3 present exemplary characteristics of the broadcast, data and return channels depicted in the system of FIG. 1, according to the invention.

FIGS. 4 and 5 list the data traffic type and an exemplary bit rate allocation for services provided via the upstream channel and downstream channels of FIG. 1.

FIG. 9 lists and describes the exemplary interfaces 1–10 identified in the server system of FIG. 8, according to the invention.

DETAILED DESCRIPTION OF THE DRAWINGS

Figure 1:
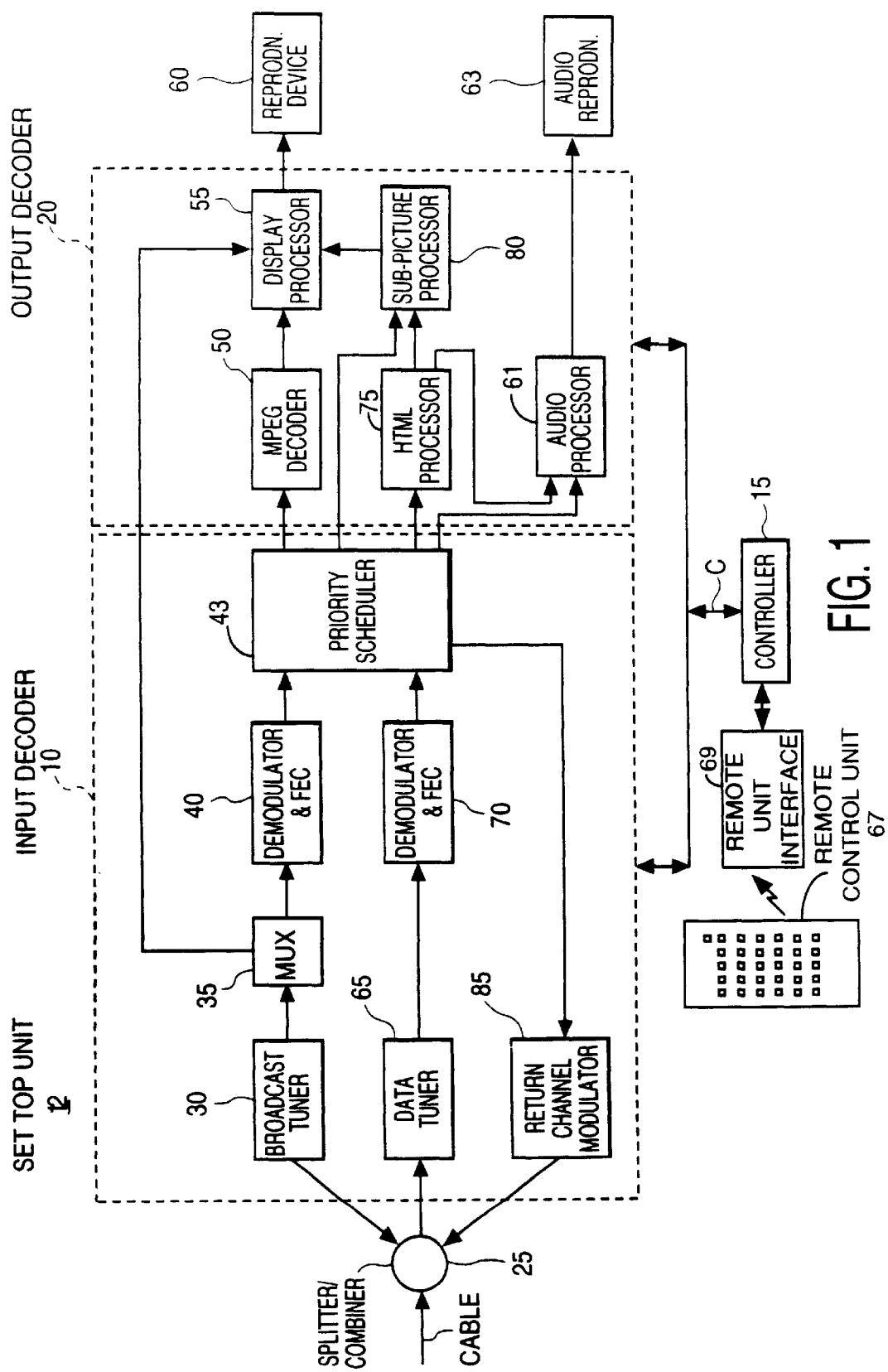
FIG. 1 shows a scaleable decoder system for efficiently communicating with a plurality of sources and for processing exemplary TCP/IP and MPEG format data, according to the invention.

FIG. 1 shows a decoder system providing efficient communication with a plurality of sources, according to the invention. The decoder system advantageously incorporates separate tuner, demodulator and processing paths for concurrent processing and decoding of data encoded in different data formats. The decoder system also advantageously incorporates a separate return channel communication path permitting secure return communication with a broadcast source, for example. The exemplary embodiment of FIG. 1 supports decoding of data in TCP/IP (Transmission Control Protocol/Internet Protocol) and MPEG (Motion Picture Experts Group) format (e.g. per MPEG2 ISO/IEC 13818-1 of Jun. 10, 1994, and ISO/IEC 13818-2, of Jan. 20, 1995). In addition, the set-top box system of FIG. 1 is compatible with the Multimedia Cable Networks Systems (MCNS) preliminary requirements.

The architecture of FIG. 1 enables scaleable (i.e. dynamically variable bit-rate) concurrent decoding of image representative data from separate sources in different formats. As such, data of different data formats may be processed by the scaleable decoder system of FIG. 1 without being encoded in accordance with an encompassing higher layer communication format. Thereby, the decoder system avoids the overhead and inefficiency involved in processing data hierarchically encoded using such an additional communication format.

The decoder system also incorporates a scheduler system for prioritizing the processing of both received data and data for return communication to a broadcast source, for example. The received and return data is allocated a desired hierarchical data output priority based on features including, a) a function associated with the data, b) a protocol characteristic of the data, or c) a physical communication channel by which the data is conveyed. Exemplary functions performed by the decoder include i) Email, ii) Internet web page browsing, iii) Internet telephony, iv) conventional telephony, v) fax, vi) videophone, vii) broadcast video, audio and radio processing and viii) home control functions. The desired hierarchical data output priority is derived from a priority profile or map. The priority profile comprises a database allocating a relative priority to data packets associated with an individual function, protocol characteristic, or communication channel. The information in the priority profile comprises pre-stored default information, user entered information, or information broadcast to the decoder from a service provider, for example. The profile may also comprise information derived from several of these sources.

Although the decoder system is described as processing data received via co-axial cable in MPEG and Internet protocol compatible format, this is exemplary only. The decoder system processes data supporting functions including Email, Internet web page browsing, Internet telephony, conventional telephony, fax, videophone, broadcast video, audio and radio and home control functions. Further, the principles of the invention may be applied to systems in which the types of transmission channels and communication protocols may vary, or to systems in which the coding and modulation types may vary. Such systems may include, for example, satellite, terrestrial, Internet and intranet broadcast and communication systems employing non-MPEG and non-Internet compatible protocols. Further, the invention principles apply to the processing of any form of data such as telephone messages, computer programs, Internet data or other communications, for example.

In overview, in set-top box system 12 of FIG. 1, a first carrier modulated with broadcast video data and a second carrier modulated with Internet data, e.g. web page information, is received by splitter/combiner unit 25 and processed by input decoder 13. Unit 13 tunes to the respective first and second carriers and demodulates, forward error corrects and prioritizes the received data to provide demodulated digital data for further processing by output decoder 20. Unit 13 also derives an analog video signal from the received data and provides the signal to unit 20. Unit 20 processes the digital data including MPEG compatible video and audio data and Internet protocol data for display and audio reproduction by units 60 and 63 respectively. In another mode unit 20 also processes the analog video data from unit 13 for display by device 60.

A set-top box user selects a function to be performed, e.g. the viewing of a particular program or web page data, by on-screen menu selection and cursor command using remote control unit 67. Unit 15 controls the operation of the elements of input decoder 13 and output decoder 20 and responds to remote control unit 67 commands using a bi-directional data and control signal bus C. Controller 15 controls the functions of individual elements within units 13 and 20 by setting control register values within these elements with control bus C. In addition, unit 15, in conjunction with unit 13, initiates and prioritizes the generation and transmission of messages for return communication on the coaxial cable link to a service provider, for example.

Considering FIG. 1 in detail, splitter/combiner 25 provides a frequency multiplexed signal incorporating first and second Quadrature Amplitude Modulated (QAM) carriers to tuners 30 and 65. The first and second carriers are independently QAM modulated using a selectable symbol constellation of either 256 or 64 points. Tuner 30 derives a first carrier modulated with MPEG compatible program representative audio, video and associated data from the frequency multiplexed signal. Tuner 65 derives a second carrier modulated with Internet protocol web page representative data from the frequency multiplexed signal. Tuners 30 and 65 include frequency demultiplexer, radio frequency (RF) tuner and intermediate frequency (IF) mixer and amplification stages for down-converting the signal from unit 25 to lower frequency bands to derive the first and second carriers respectively.

Tuner 30, in conjunction with controller 15, determines whether the first carrier contains digital MPEG compatible video data or comprises an analog video signal. A digital video data representative first carrier is provided by tuner 30 to demodulator 40 via multiplexer (mux) 35 and an analog video signal is provided via mux 35 to display processor 55 in output decoder 20. Tuner 65 provides the second carrier to demodulator 70. In this exemplary system, the input frequency multiplexed signal from unit 25 contains 33 Physical Transmission Channels (PTCs 0–32). Each Physical Transmission Channel (PTC) is allocated a 6 MHz bandwidth and contains, for example, up to 6 sub-channels each with unique carrier frequency.

It is assumed for exemplary purposes that a set-top box user selects a sub-channel (SC) for viewing using remote control unit 67. Controller 15 uses the selection information provided from remote control unit 67 via interface 69 to appropriately configure elements of input decoder 13 to receive the PTC and corresponding carrier frequency of the selected sub-channel SC. Following down conversion, the first carrier output signal from tuner 30 for the selected PTC has a bandwidth of 6 MHz and a center carrier frequency in the range of 54–806 MHz. In the following discussion, an RF channel or Physical Transmission Channel (PTC) refers to an allocated broadcaster transmission channel band which encompasses one or more sub-channels.

Controller 15 configures the radio frequency (RF) tuner and intermediate frequency (IF) mixer and amplification stages of tuner 30 to receive the selected PTC first carrier frequency. The down-converted first carrier frequency output for the selected PTC provided by tuner 30, via mux 35, is demodulated by unit 40. The primary functions of demodulator 40 are recovery and tracking of the carrier frequency, recovery of the transmitted data clock frequency, and recovery and forward error correction of the MPEG compatible video data itself. Unit 40 also recovers sampling and synchronization clocks that correspond to transmitter clocks and are used for timing the operation of tuner 30, demodulator 40 and scheduler 43.

Unit 40 demodulates the QAM modulated first carrier signal to provide demodulated digital output data. Also, in unit 40, the demodulated digital output data is mapped into byte length segments which are deinterleaved and Reed-Solomon error corrected according to known principles. In addition, unit 40 provides a Forward Error Correction (FEC) validity or lock indication to controller 15. Reed-Solomon error correction is a known type of Forward Error Correction. The FEC lock indication signals that the Reed-Solomon error correction is synchronized to the data being corrected and is providing a valid output. It is to be noted that the tuning, demodulator and decoder functions implemented by units 30 and 40 (and also units 65 and 70) are individually known and generally described, for example, in the reference text *Digital Communication*, Lee and Messerschmidt (Kluwer Academic Press, Boston, Mass., USA, 1988). The recovered output from unit 40 is in the form of an MPEG compatible transport datastream containing program representative multiplexed audio, video and data components. This transport stream is provided to scheduler 43.

The second carrier, modulated with Internet protocol web page representative data, is derived by tuner 65 and demodulated and error corrected by unit 70. Tuner 65 and demodulator 70 duplicate the tuner and demodulator functions of units 30 and 40 respectively and advantageously provides an independent processing path permitting concurrent processing of Internet protocol data and MPEG compatible data, for example. Tuner 65 and demodulator 70 operate in the manner previously described in connection with corresponding units 30 and 40. Tuner 65 and demodulator 70 provide data to scheduler 43 in Internet protocol format representing a user selected web page.

Scheduler 43 in conjunction with controller 15 prioritizes both the Internet protocol data from demodulator 70 and the MPEG compatible transport stream data from demodulator 40, for processing by elements of output decoder 20. Scheduler 43 and controller 15 also prioritize the data for return communication via the coaxial cable link to a broadcast source, for example. Scheduler 43, under control of unit 15, identifies individual Internet protocol packets from unit 70 representing a specific function e.g. web page information requested via a web browser. In addition, scheduler 43, under control of unit 15, identifies individual MPEG compatible packets representing a specific program e.g. "Seinfeld™" on a selected channel NBC™ and associated data. The associated data comprises packet identification and assembly information supporting the MPEG decoding and recovery of a program and also includes ancillary sub-picture information for display such as program guide data.

Scheduler 43 incorporates a demultiplexer for matching the PIDs of incoming MPEG packets in the datastream from unit 40 with PID values pre-loaded in control registers within unit 43 by controller 15. Similarly, scheduler 43 matches data identifiers such as data source and data destination, data type, IP address, and Universal Resource Locator (URL) codes in the Internet protocol datastream from unit 70 with values pre-loaded in control registers within unit 43 by controller 15. This matching process serves to identify the function and program representative Internet and MPEG data packets for prioritizing and further processing. The resultant identified Internet and MPEG packets are stored in memory and sequentially accessed in accordance with a predetermined priority profile (map) associating data having a specific characteristic and function with a desired priority. Thereby, unit 43 provides buffered prioritized Internet protocol data including web page HTML™ (Hyper Text Mark-up Language) and associated Java™ data (and other data e.g. JPEG, GIF, TIF type data) to HTML™ processor 75. Unit 43 also provides the prioritized MPEG video, audio and sub-picture packets to MPEG video decoder 50, audio processor 61 and sub-picture processor 80 respectively. The method of operation of scheduler 43 and its implementation is described later in more detail in connection with FIGS. 6 and 7.

MPEG decoder 50 decodes and decompresses prioritized MPEG compatible packetized video data from unit 43 and provides prioritized decompressed program representative pixel data for storage in the pixel representative memory in display processor and NTSC encoder 55. Audio processor 61 decodes prioritized packetized audio data from unit 43 and provides prioritized decoded and amplified audio data synchronized with the associated decompressed video data to device 63 for audio reproduction. Processor 75 decodes the HTML™ and Java™ encoded web information from unit 43 and provides web page image representative pixel data for storage in memory within sub-picture processor 80. Processor 75 also decodes data encoded in other formats e.g. JPEG, TIF, GIF formats and in other mark-up languages e.g. SGML (Standard Generalized Mark-up Language) and provides the decoded data to sub-picture processor 80 for further processing. Processor 80, under direction of controller 15, formats the stored web page image pixel data for storage as an overlay in the pixel representative memory contained in display processor 55 for reproduction by unit 60 as a merged display. In addition, controller 15 incorporates a web page browser supporting execution of a full complement of web page browser functions. Thereby unit 15, together with processor 75 and processor 80, provide a display via unit 60 of either a custom web page browser or a standard browser such as Netscape Navigator™ through which full Internet access is available.

Sub-picture processor 80 incorporates an On-Screen Display (OSD) text and graphics generator used in decoding and processing sub-picture data from unit 43. Processor 80 also uses its internal OSD generator in creating pixel mapped data representing program guide, subtitling, control and information menu displays including selectable menu options, and other ancillary items. The text and graphics produced by processor 80 are generated in the form of overlay pixel map data under direction of controller 15. This overlay pixel map data is combined and synchronized with the decompressed pixel data from MPEG decoder 50 and decoded Internet protocol web page data from processor 75 in the pixel representative memory contained in display processor 55. Combined pixel map data representing a video program on sub-channel SC from unit 50 together with web page display data and associated sub-picture text message data from unit 80 is encoded as an NTSC signal by processor 55 and output for reproduction by unit 60 as a merged display. Unit 55, in another mode, also encodes the analog video signal provided via mux 35 from tuner 30 as an NTSC signal for output and reproduction by unit 60.

Set-top box system 12 supports a full complement of multimedia functions in addition to the described exemplary web browsing and MPEG video processing functions. These multimedia functions include, for example, Email, Internet telephony, conventional telephony, fax, videophone, radio, broadcast audio, storage and home control functions. The decoding and prioritization principles detailed herein are also applied in the processing of data for such multimedia functions. For example, in the processing of Internet telephony data, processor 75 decompresses and decodes compressed audio data encoded in Internet protocol format and assigned a high level e.g. real time processing priority by unit 43. The decompressed audio data is provided by processor 75 to unit 63 for audio reproduction. Further, processor 75 incorporates functions for the processing of multimedia data in different data formats and protocols for presentation to a user following processing by units 80, 55, 60, 61 and 63 in a manner similar to that previously described.

Controller 15, in conjunction with modulator 85 and scheduler 43, initiates and implements return channel communication with an Internet or broadcast service provider on the coaxial cable input link via splitter/combiner 25. A message request for Internet web page information (or a request associated with another function), for example, may be initiated by user selection of a displayed menu option on unit 60. Controller 15, in conjunction with unit 85 and scheduler 43 generates, prioritizes and encodes the web page request message for transmission to a service provider on the coaxial cable link via unit 25. Controller 15 also determines whether the requested Internet access is authorized from conditional access or smart card user entitlement information e.g. from a smart card unit (not shown to simplify the drawing). If the requested Internet access is authorized, controller 15 initiates communication with a service provider on the return channel. Controller 15, in conjunction with units 43 and 85, establishes communication with the service provider using pre-stored request access data (such as telephone number, IP address, URL code and conditional access data) and generates web page request message data. The generated request message data is in Internet protocol format and incorporates the appropriate source, destination and IP address codes.

Scheduler 43 stores and buffers the web page request message data packets in memory and sequentially accesses the packets in accordance with a predetermined priority profile (map) associating return data having a specific characteristic and function with a desired priority. Thereby, unit 43 provides buffered prioritized web page request message data to modulator 85. Modulator 85 forward error corrects, interleaves and encodes the request message data using QPSK (Quaternary Phase Shift Keying) modulation. Unit 85 also optionally encrypts the request message data (under direction of controller 15) in a secure data format and transmits the encoded data with the desired priority to a service provider via the cable link and unit 25. Unit 85 may alternatively code, scramble or interleave the request message (or other return data) or employ other protection mechanisms to enhance data security. Such data security is of particular importance in electronic transaction type messages e.g. involving credit card data. In addition, the return channel may also be used for functions such as a) telemetry including meter reading, b) video and alarm monitoring, c) home environment monitoring, d) home appliance monitoring, e) merchandise ordering and f) program conditional access and entitlement management. The method of prioritizing received and return data employed by scheduler 43 is described later in more detail in connection with FIGS. 6 and 7.

As previously described, the architecture of the set-top box system of FIG. 1 provides independent concurrent processing of broadcast data in different formats and from different sources (e.g. MPEG program data from a broadcast source and Internet protocol web page data from an Internet service provider). This architecture is fully scaleable and enables the decoding of dynamically partitionable data and bandwidth between the two downstream (e.g. MPEG and Internet) processing paths. As such, the architecture supports concurrent decoding of an MPEG broadcast of an HBO movie and accompanying Internet web page data, for example. In this example, the accompanying web page data is intermittent and the bandwidth occupied by the web page data may be dynamically re-allocated to the MPEG data or other supplementary data services e.g. program guide, Email etc. The architecture also permits the dynamic partitioning of bandwidth between the return channel path and the two downstream processing paths.

FIG. 2 shows exemplary characteristics of the downstream Internet protocol data and MPEG broadcast video channels. Although FIG. 2 shows identical characteristics for both downstream channels, this is exemplary only and the characteristics may be different for each channel. FIG. 3 shows exemplary characteristics of the upstream return communication channel. FIG. 4 lists the data traffic type and an exemplary bit rate allocation for services provided via a downstream channel of FIG. 1. FIG. 5 lists the data traffic type and an exemplary bit rate allocation for services provided via the upstream channel of FIG. 1. The processing architecture of the set-top box system 12 of FIG. 1 is fully scaleable and is capable of adaptively processing data dynamically allocated between the two downstream channels. Set-top box system 12 is also capable of adaptively processing data occupying a bandwidth that is dynamically allocable between the downstream channels and the return channel.

Figure 6:
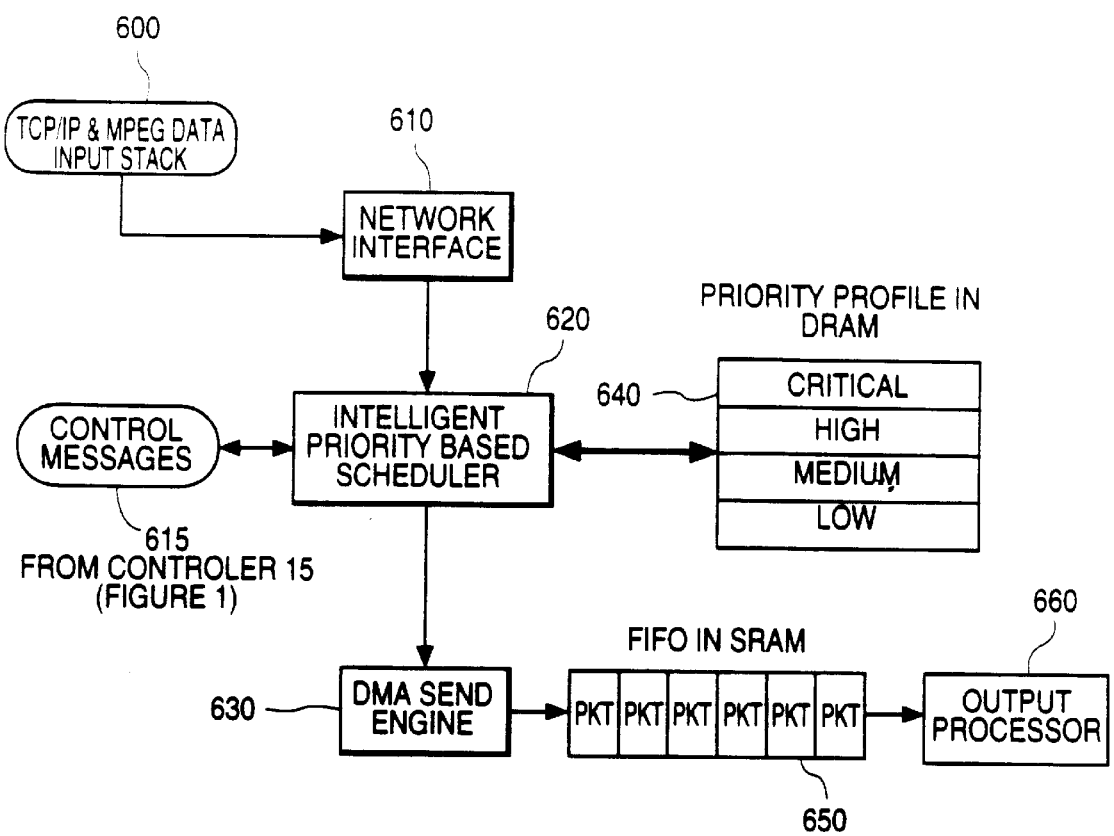
FIG. 6 shows a priority schedule system for prioritizing processing of broadcast and data packets for bi-directional applications, according to the invention.

FIG. 6 shows a priority schedule system for prioritizing processing of MPEG broadcast and Internet protocol data packets received from units 40 and 70 (FIG. 1) respectively. The system of FIG. 6 is also used for prioritizing processing of data for return communication to a service provider via unit 85 (FIG. 1). In the system of FIG. 6, input data e.g. MPEG, Internet protocol TCP/IP or return data is placed in an input storage stack 600. Network interface 610 identifies the type of received data in stack 600 (e.g. MPEG, Internet protocol or return data) and formats it for identification of characteristics (attributes) by intelligent scheduler 620. Scheduler 620 responds to control and synchronization messages 615 from controller 15 (FIG. 1) in performing intelligent scheduling functions.

Scheduler 620 (FIG. 6) examines the formatted data from interface 610 for function, protocol and communication channel attributes contained in priority profile 640 stored in internal DRAM storage. Scheduler 620 also compares attributes in the received data with attributes in the priority profile and collates the received data packets by desired output priority based on this comparison. Scheduler 620 allocates storage in sequential output FIFO (First-In First-Out) unit 650 based on the desired output priority (e.g. critical, high, medium or low priority—640) and provides the collated prioritized data to allocated storage locations in FIFO 650 via a high speed DMA (Direct Memory Access) interface 630. Output processor 660 sequentially accesses the prioritized data from FIFO 650 and formats it for further processing by units 40, 70 and 85 (FIG. 1).

Figure 7:
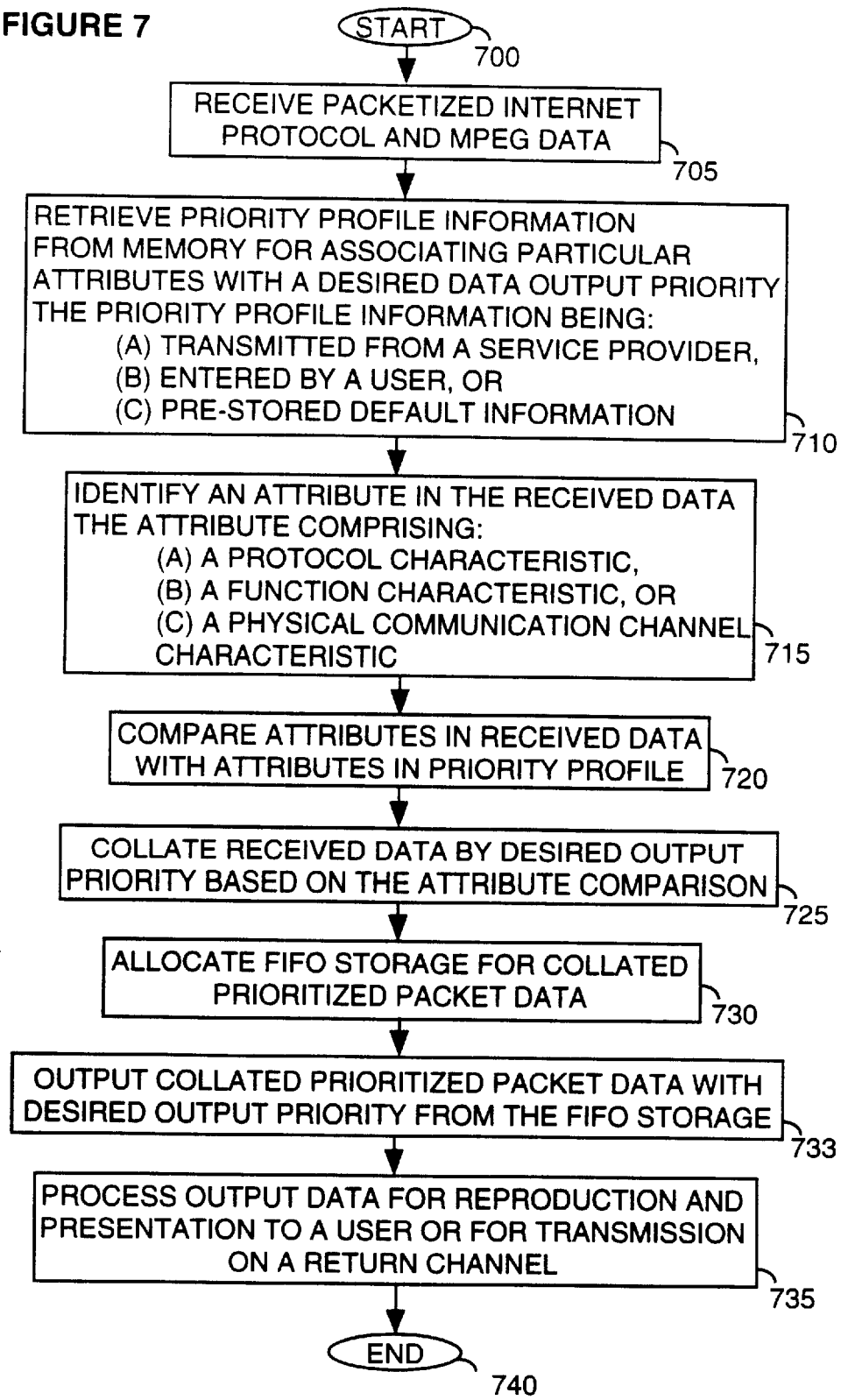
FIG. 7 shows a flowchart of a method for prioritizing processing of broadcast and data packets suitable for use in the system of FIG. 6, according to the invention.

FIG. 7 shows a flowchart detailing a method for prioritizing processing of input MPEG broadcast data, Internet protocol data and return data suitable for use in the system of FIG. 6. In step 705 of FIG. 7, following the start at step 700, scheduler 620 (FIG. 6) receives input data and in step 710 retrieves priority profile information from memory. The priority profile hierarchically associates a particular desired output priority to input data exhibiting a particular attribute or combination of attributes. The priority profile may be transmitted from a service provider, entered by a user or may comprise pre-stored default information or may be derived from a combination of these sources. A service provider is able to provide different grades of service each offering a user different data access times at corresponding different billing rates by downloading a priority profile to a user's set-top box system. The downloaded priority profile enables the service provider to control user access to received information. For example, by downloading (or pre-installing) a priority profile, an Internet service provider may provide Internet access at a minimum data rate of 1 kbit per second at $10 per month and 5 kbits per second at $20 per month. Alternatively, a user may enter priority profile information to configure his system to process and communicate data or messages in a desired order or with a desired precedence.

The priority profile information may be security encoded e.g. by encryption, scrambling or coding for data protection purposes in order to prevent unauthorized use of the high speed and premium data access levels of service. In this case, the priority profile information is decoded (e.g. decrypted or descrambled) by controller 15 (FIG. 1) in conjunction with scheduler 620 (FIG. 6), prior to its use. Such decryption or descrambling may be authorized and implemented in a conditional access and entitlement management system in the set top box system 12 of FIG. 1 (not shown to preserve drawing clarity). It is to be noted that the priority profile may be transmitted to any and all nodes in a network system such as the Internet or an intra-net, LAN or WAN etc. for assuring quality of service (QOS). The nodes may include network devices such as servers (distribution hubs), gateways, terminals, routers and switches. The priority profile may also be distributed and used in conjunction with communication protocols incorporating data priority indicators for reserving network resources to ensure quality of service throughout a network communication path or merely for sections of a path. Such communication protocols include, for example, Resource ReServation Protocol (RSVP) Internet draft Jun. 14, 1997; Real-time Transport Protocol (RTP) Request for Comment document RFC 1889, Feb. 1, 1996, both documents being available on the Internet. The priority profile information may also be used in systems operating in accordance with standards defining system elements for multimedia networking and communication such as H.323 of November 1996 and H.324 developed by the International Telecommunication Union (ITU).

In step 715 of FIG. 7, scheduler 620 identifies attributes in data received in step 705. The attributes identified include (i) protocol characteristics, (ii) function type characteristics and (iii) communication channel characteristics.

The protocol characteristics include, for example, (a) a data source identifier, (b) a data destination identifier, (c) a data type identifier, (d) a data priority indicator, (e) a data error indicator, (f) an entitlement indicator, (g) an Internet protocol indicator, (h) an MPEG compatible indicator, and (i) a packet identifier.

The function type characteristics identify, for example, functions including a) Email, b) Internet web page browsing, c) Internet telephony, d) conventional telephony, e) fax, f) broadcast video processing, g) videophone processing, h) broadcast radio processing, i) broadcast audio processing and j) home control functions such as alarm, telemetry, appliance and environment control and monitoring.

The communication channel characteristics identify the type of physical communication link e.g. telephone line, terrestrial, cable or satellite link, fiber optic link, Wide Area Network (WAN), Local Area Network (LAN), Internet, or intra-net. The communication channel characteristics also identify different channels of the same type of communication link e.g. different telephone lines.

In step 720 of FIG. 7, scheduler 620 compares attributes identified in step 715 with attributes in the priority profile and in step 725 collates the packetized input data by desired output priority based on this comparison. The use of a priority profile in this manner provides a flexible means of structuring the priority of a wide variety of data derived from a plurality of different sources. Data may be advantageously prioritized by any combination of communication link, protocol or function characteristics. Thereby data of a particular function, or data communicated on a particular link, may be prioritized by source or destination or type. Email messages, for example, may be prioritized according to source identifier i.e. Email from certain sources may be given higher priority. Similarly, return messages to specific destinations (identified by destination identifier) may be allocated and coded with a higher priority. Further, scheduler 620 interprets dedicated priority indicators e.g. an Internet protocol data type (precedence) indicator in the input data and allocates this data the appropriate priority. Similarly, hierarchical processing priority may also be allocated using the priority profile based on entitlement indicators, Internet protocol indicator, MPEG compatible indicator e.g. packet identifiers.

In step 730, scheduler 620 allocates storage in a sequential output FIFO (First-In First-Out unit 650 of FIG. 6) based on the desired output priority and provides the collated prioritized data to the allocated storage locations in FIFO 650 via a high speed DMA (Direct Memory Access) interface 630. The collated prioritized packet data is output from FIFO 650 with the desired output priority in step 733 (FIG. 7). In step 735, the collated prioritized output data is processed for reproduction and presentation to a user or for return transmission to a service provider. Such processing may involve encoding and encrypting the data for secure return communication, for example, and synchronizing the data with other set-top box processes. The process ends at step 740.

Figure 8:
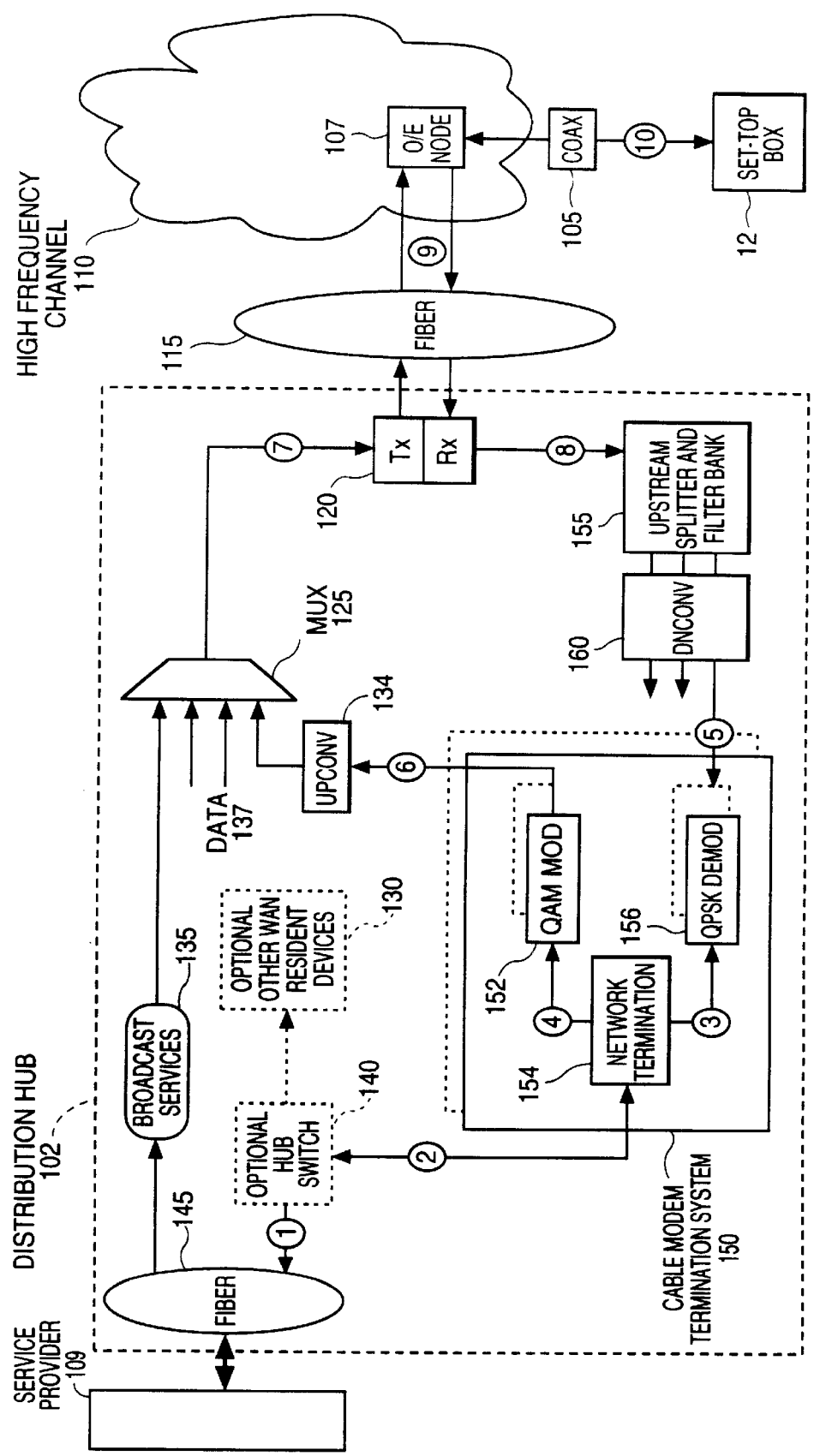
FIG. 8 shows a server distribution hub for distributing broadcast data from a plurality of service providers to the decoder of FIG. 1 and for processing upstream data from the decoder of FIG. 1, according to the invention.

FIG. 8 shows a server distribution hub 102 for distributing broadcast data and providing multimedia services from one or more service providers 109 to the set-top box system 12 (FIGS. 1 and 8) and for processing upstream data from unit 12, according to the invention. QAM modulated broadcast data such as MPEG compatible video data or analog representative video data from one or more service providers 109 (FIG. 8) is provided via optical fiber link 145 and channel 135 to mux 125. Unit 125 provides a multiplexed output from sources including the received broadcast data from channel 135, local hub generated data 137, and from QAM modulated data from cable modem termination 150 (via up converter 134). The multiplexed output from mux 125 is output to optical fiber communication interface 120. Unit 120 communicates with set-top box system 12 of FIG. 1 by transmitting downstream QAM data and receiving upstream QPSK (or QAM) data on high frequency channel 110 via optical fiber link 115, coax 105 and electrical to optical converter 107.

Upstream data from set box 12 is received by unit 120 via channel 110 and routed via splitter 155 and down converter 160 to cable modem termination system 150. System 150 demodulates the QPSK modulated upstream data from converter 160 and provides the demodulated upstream data to service provider 109 via network interface 154, optional hub switch 140 and optical fiber link 145. Alternatively, optional hub switch 140 may provide the demodulated upstream data to an optional WAN device 130. Unit 154 of system 150 also receives downstream data from service provider 109 or WAN device 130 via switch 140. Unit 154 formats and processes the downstream data from switch 140 and provides it to unit 152 for QAM modulation and subsequent up conversion by converter 134. The up-converted data from converter 134 is transmitted to set-top box system 12 via mux 125 as previously described.

FIG. 9 lists and describes the exemplary interfaces 1–10 identified in the server system of FIG. 8, according to the invention.

The architectures of FIGS. 1, 6 and 8 are not exclusive. Other architectures may be derived in accordance with the principles of the invention to accomplish the same objectives. Further, the functions of the elements of system 12 of FIG. 1 and the process steps of FIG. 7 may be implemented in whole or in part within the programmed instructions of a microprocessor.

What is claimed is:

1. In a video decoder system, a method for processing packetized data comprising header information and payload information and containing attributes associated with the content of said payload information, comprising the steps of:

receiving said packetized data;

identifying an attribute of said received packetized data;

comparing said identified attribute with an attribute in a predetermined hierarchical priority profile for associating individual attributes with a desired data output priority;

collating said received packetized data by desired output priority using said attribute comparison; and outputting said collated packetized data with said desired output priority.

2. A method according to claim 1, wherein said attribute represents at least one of a) a data source identifier, b) a data destination identifier, c) a data type identifier, d) a data priority indicator, e) a data error indicator, f) an entitlement indicator, g) an Internet protocol indicator, h) an MPEG compatible indicator, and i) a packet identifier.

3. A method according to claim 1, including the step of receiving hierarchical priority profile data provided via a data entry menu and a data entry device.

4. A method according to claim 1, including the step of receiving hierarchical priority profile data from a service provider.

5. A method according to claim 4, wherein said service provider hierarchical priority profile data enables a service provider to control quality of service and structure billing accordingly.

6. A method according to claim 4, wherein said attribute represents at least one of a) a userid, b) a password, c) a data destination identifier, d) a data type identifier, e) a data priority indicator, and f) an entitlement indicator.

7. A method according to claim 1, wherein said predetermined hierarchical priority profile comprises pre-stored default priority information.

8. A method according to claim 1, including the step of allocating storage priority in said video decoder in accordance with said hierarchical priority profile.

9. A method according to claim 1, including the step of processing said output collated packetized data for transmission to a service provider.

10. A method according to claim 1, including the step of processing said output collated packetized data for display on a reproduction device.

11. A method according to claim 1, including the step of security decoding said predetermined hierarchical priority profile.

12. In a video processing system, a method for processing packetized data comprising header information and payload information and containing attributes associated with the content of said payload information, comprising the steps of:
   receiving said packetized data;
   receiving hierarchical priority profile data provided by at least one of,
   a) user entry and
   b) transmission from a service provider,
   said hierarchical priority profile data associating individual attributes with a desired data output priority;
   identifying an attribute of said received packetized data;
   comparing said identified attribute with an attribute in said hierarchical priority profile;
   collating said received packetized data by desired output priority using said attribute comparison; and
   outputting said collated packetized data with said desired output priority.

13. A method according to claim 12, wherein said attribute represents at least one of a) a data source identifier, b) a data destination identifier, c) a data type identifier, d) a data priority indicator, e) a data error indicator, f) an entitlement indicator, g) an Internet protocol indicator, h) an MPEG compatible indicator, and i) a packet identifier.

14. A method according to claim 12, including the step of processing said output collated packetized data for transmission on an output channel.

15. A method according to claim 12, wherein said hierarchical priority profile data prioritizes packet data associated with two or more functions from among a) Email, b) Internet web page browsing, c) Internet telephony, d) telephony, e) fax, f) broadcast video, g) videophone, h) broadcast radio, i) broadcast audio and j) home control.

16. A method according to claim 15, wherein said hierarchical priority profile data also prioritizes packet data of one of said functions a) to i) by at least one of A) a data source identifier, B) a data destination identifier, C) a data type identifier, D) a data priority indicator, and E) an entitlement indicator.

17. In a video processing system, a method for processing packetized data comprising header information and payload information and containing attributes associated with the content of said payload information, comprising the steps of:
   receiving said packetized data;
   receiving hierarchical priority profile data associating individual attributes with a desired data output priority for prioritizing data for output based on at least one of,
   a) a function associated with said packetized data, and
   b) a protocol characteristic of said packetized data;
   identifying an attribute of said received packetized data;
   comparing said identified attribute with an attribute in said hierarchical priority profile;
   collating said received packetized data by desired output priority using said attribute comparison; and
   outputting said collated packetized data with said desired output priority.

18. A method according to claim 17, wherein said function comprises one or more of a) Email, b) Internet web page browsing, c) Internet telephony, d) telephony, e) fax, f) broadcast video, g) videophone, h) broadcast radio, i) broadcast audio and j) home control.

19. A method according to claim 17, wherein said protocol characteristic comprises at least one of a) a data source identifier, b) a data destination identifier, and c) a data type identifier.

* * * * *